Oct. 25, 1960    D. B. KREIDER ET AL    2,957,196
BOLT AND STUD SPACER FOR LIGHTWEIGHT SANDWICH PANELS
Filed Nov. 25, 1958
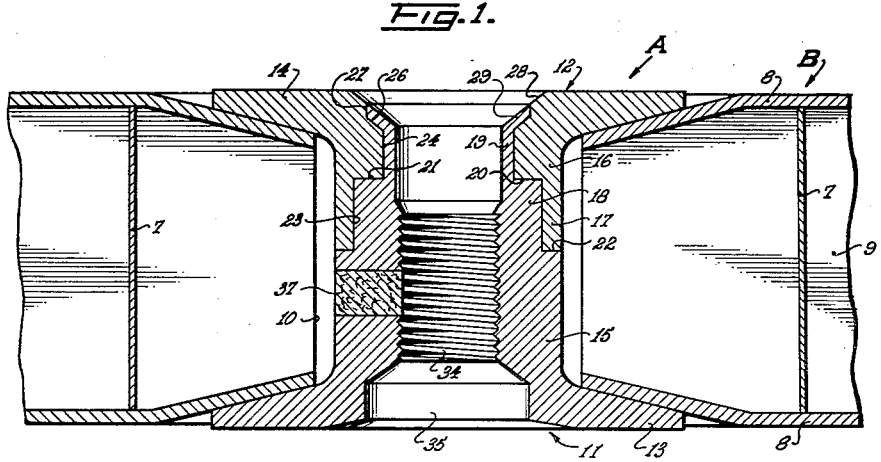
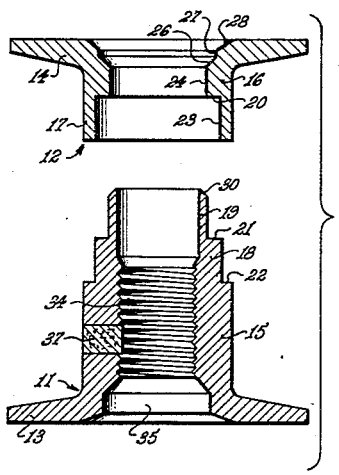
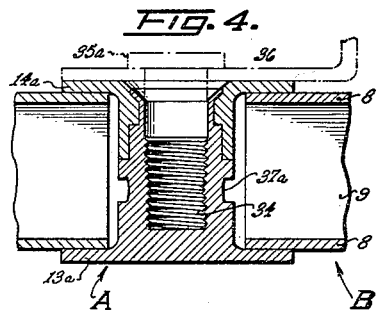
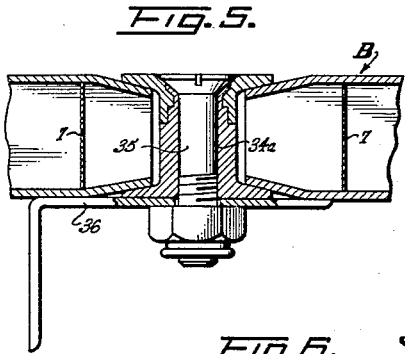
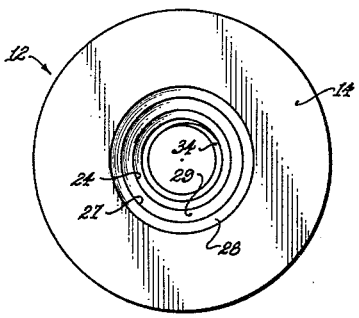
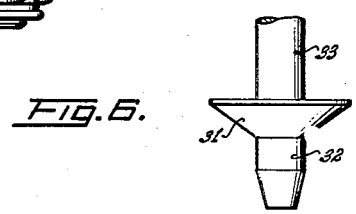
INVENTORS
DAVID B. KREIDER
FRED M. DELGADILLO
BY
Lynn N Latta
ATTORNEY

United States Patent Office 2,957,196
Patented Oct. 25, 1960

2,957,196

BOLT AND STUD SPACER FOR LIGHTWEIGHT SANDWICH PANELS

David B. Kreider and Fred M. Delgadillo, Santa Ana, Calif., assignors to Shur-Lok Corporation, Anaheim, Calif., a corporation of California Filed Nov. 25, 1958, Ser. No. 776,347

10 Claims. (Cl. 16—2)

This invention relates to fasteners for effecting attachment between panels of lightweight sandwich construction and other parts, such as structural members carrying such panels or accessory parts and trim requiring attachment to the panels. Such panels are used, for example, in air frame construction where a maximum factor of strength vs. minimum weight is an essential requirement.

The general object of the invention is to provide an improved fastener of an insert type now commonly referred to as a "spacer," defining an opening or recess in the panel, adapted to receive a through bolt or a threaded stud for effecting attachment between the panel and another part or member.

Heretofore, fasteners of this type commonly utilized in industry have embodied a tight compression or interference fit between the respective stem sections of the spacer unit for securing them together. Such an interference fit requires the stretching of the female part of the coupling between the stem sections, and such stretching tends to weaken the coupling and establish incipient failure. Furthermore, some difficulty is encountered in forcing the telescoping parts of the coupling together because of the necessity for stretching the female part of the coupling. Any attempt to reduce the amount of interference between the coupling parts will reduce the security of coupling attachment.

With the foregoing in mind, the present invention provides a fastener wherein telescoping coupling parts will freely telescope with one another without interference, and wherein one of the coupling parts is deformed to provide a positive and much more secure attachment between the coupling parts than that heretofore provided.

An object of the invention is to provide a two part fastener embodying a combination of maximum shear-resisting support between the coupled parts and maximum ease of setting a securing tip on one of the coupling parts into interlocking engagement with the other coupling part.

A further object is to provide such a fastener wherein the securing tip, when deformed into locking engagement with the cooperating coupling part, becomes a part of a recessed throat for receiving or partially receiving the head of a securing element.

More fully stated, the invention aims to provide a fastener which, when attached to a panel, will not readily pull loose, will prevent crushing of the honeycomb structure of the panel except in its immediate vicinity and will distribute compression and shear loads to the panel.

The fastener according to the invention is formed of two parts, each including a hollow stem section and an outwardly flanged head, the stem sections of the respective parts having complementary stepped portions adapted to abut together when the parts are inserted stem foremost into the opposite ends of an opening through the panel, and the stem of one part having a thin tubular securing tip at its end, which can be swaged outwardly into contact with an internal recessed surface on the other part to lock the two parts together and to the panel. The length of the parts is governed by the thickness of the panel with which the fastener is to be used and is such that when the parts are joined by swaging the lip on the blocking tip, the heads of the two ends of the fastener are pressed tightly against the skins of the panel.

Other objects and advantages will become apparent in the ensuing specification and appended drawing in which:

Fig. 1 is a sectional view, on an enlarged scale, through a panel and spacer assembly embodying my invention;

Fig. 2 is an exploded axial sectional view of the spacer prior to installation;

Fig. 3 is an end view of the spacer part;

Fig. 4 is an axial sectional view of a spacer assembly embodying a modified form of the invention;

Fig. 5 is an axial sectional view of a spacer in assembly with a panel and attached part, the spacer embodying a further modified form of the invention; and Fig. 6 is a view of a tool that may be used for setting the fastener.

Referring now to the drawing in detail, and in particular to Figs. 1, 2 and 3, I have shown therein as an example of one form in which the invention may be embodied, a fastener, indicated generally at A, for installation in a lightweight panel indicated in Fig. 1 at B. The panel B may be of the metallic sandwich type used in aircraft construction wherein opposed skins 8 (e.g. of thin sheet aluminum or stainless steel) are bonded to the edges of a series of transverse metallic strips formed into a honeycomb cellular structure indicated schematically at 9. The fastener A is received in an opening 10 which is drilled in the panel prior to installation of the spacer.

The fastener A comprises two sections, indicated generally at 11 and 12. For convenience in terminology we prefer to designate the part 11 as a spacer and the part 12 as a grommet. The spacer 11 comprises the main body of the spacer unit, having a head 13 and a tubular stem section 15 which extends substantially all the way through the panel B, and the grommet 12 functioning as a securing cap or collar which includes a head 14 and a relatively short stem section 16 that is coupled to the stem section 15.

The coupling attachment between the parts is provided for by respective coupling elements consisting in a cylindrical coupling collar 17 constituting the end portion of stem section 16, a cylindrical neck 18 formed as an integral intermediate portion of stem section 15, and a cylindrical tubular securing tip 19 constituting the end portion of stem 15 projecting beyond neck section 18. Coupling collar 17 defines in the grommet 14 a cylindrical counterbore the bottom of which is defined by a radial shoulder 20 in stem section 16. Neck 18 is snugly but freely received in this counterbore, its end being defined by a shoulder 21 which is designed to abut the shoulder 20 in the assembled spacer. The end of coupling collar 17 abuts an annular radial shoulder 22 in stem section 15 at the base of neck section 18. Stem sections 15 and 16 have cylindrical external walls of a common diameter which, in the assembled spacer, provide a continuous cylindrical outer wall for the composite stem of the spacer unit.

Securing tip 19 has a wall that is quite thin, only a small fraction of the thickness of the stem section 15 at its maximum diameter where it adjoins the head 13 of the spacer 11. Grommet 12 has an inner bore 24 in which the securing tip 19 is freely but snugly received, the bore 24 extending into head 14. At the outer end of bore 24, head 14 has an inner countersink 26 which terminates at a cylindrical shoulder 27 in the head 14. An outer countersink 28 extends from shoulder 27 to the end face of head 14. In the assembled spacer, the outer end portion of securing tip 19 is expanded by swaging into a conical lip 29 which is received in and tightly seated against the conical bottom wall of countersink 26, and which defines a conical throat surface extending as a flush continuation of the outer countersink 28. Accordingly the depth of countersink 26 below countersink 28 corresponds to the wall thickness of the securing tip 19.

Referring now to Fig. 2, it may be noted that the securing tip 19 is initially of uniformly cylindrical form, with an outer end chamfered at 30 at an angle such that when expanded to provide the locking lip 29, this chamfered end 30 becomes a cylindrical end which is snugly seated against the cylindrical shoulder 27 of the grommet 14.

In the body portion of stem 15 there may be provided a threaded section 34 of the bore extending through the spacer 11. The head 13 may be counterbored at 35 to receive a rivet head or other fastener part, thus providing a through bore, of which the bore through securing tip 19 is a part. The threaded section 34 will function as a nut to receive a threaded stud extending through the throat 28, 29 and the tubular tip 19. Alternatively, as shown in Fig. 5, the through bore may be a plain cylindrical bore 34a for receiving the shank of a bolt 35, used for attaching to the panel B a part such as the bracket 36 which is shown by way of example. In such an arrangement the head of the bolt 35 may be received in the throat 28, 29 of the grommet 12 and may engage not only the lip 29 but also the outer counterbore 28 so as to provide retaining engagement against the grommet 12.

The threaded bore 34 may be provided with a thread lock in the form of a plug 37 of a tough, slightly yieldable material such as nylon, press-fitted in a radial bore in the main body of stem section 15, for engagement of the threads of a stud or screw to secure the same against unthreading movement.

Fig. 6 illustrates a tool that may be utilized for expanding the securing tip 19 to provide the locking lip 29. Such a tool may have a dimpling head 31 of frusto conical form corresponding to the taper of throat 28, 29, a pilot 32 for entering the bore of tip 19, and a shank 33 for attachment of the tool to a tool holder such as an arbor press or riveting gun.

The setting operation will be performed with the spacer head 13 seated against a supporting surface or against the end of a bucking bar. When the lip 29 is drawn tightly against the head 14 in the inner counterbore 26, the shoulder 20 will be seated snugly against shoulder 21 and the end of collar 17 will be seated against shoulder 22, thus providing very firm end support such as to position the securing tip 19 in exactly the right relationship to the grommet 12 as the parts are set, and to thereafter provide adequate compression column strength in the assembled spacer.

The heads 13 and 14 are of the countersunk type and in setting the spacer unit into the panel B, the skin sheets 8 are dimpled inwardly by the pressures exerted by the spacer heads, to permit the heads 13 and 14 to be recessed into the panel in flush relation to the respective faces thereof.

Alternatively, the spacer unit may be provided with flat heads 13a and 14a which will be engaged above the respective faces of the panel, as shown in Fig. 4. As shown in Fig. 4, the head 13a may provide a closed end or bottom for the threaded hole 34.

In the assembled spacer unit, the coupling collar 17 provides a snug surrounding engagement with neck section 18 of the spacer to provide a sturdy shear-resistant connection between the spacer and the grommet, while the relatively thin walled tubular tip 19 functions primarily to provide a lock resisting axial separation of the spacer and grommet when the lip 29 has been set. The relative radial thickness of collar 17 and neck section 18 is such as to provide adequate backing up of the female thread of bore 34 which extends not only through the main body portion of stem 15 but also a substantial portion of the length of neck section 18. Since the forces tending to separate the spacer and grommet from one another will ordinarily be of fairly low magnitude, the wall thickness of securing tip 19 is quite small (as low as one fourth the full wall thickness of the main body portion of the stem 15, or even smaller). Since shear loads are taken by the collar 17 and neck section 18, tip 19 is not subjected to shear loads.

The fastener may be quickly removed by drilling away the swaged over lip 29 of the spacer.

We claim:

1. A fastener for a lightweight panel of sandwich structure having a through opening, said fastener comprising a spacer and a grommet each including a stem section, a head at one end thereof and a coupling part at the other end thereof, the coupling part of said spacer comprising a neck having a cylindrical outer wall concentric with and reduced in diameter below the maximum outer diameter of the main body of that stem section and of a thickness more than half the total thickness of said body, and a relatively thin walled coaxial tubular securing tip projecting axially beyond the end of said neck, the coupling part of said grommet comprising a cylindrical coupling collar defining a counterbore adapted to snugly but freely receive said neck and having an inner bore extending outwardly from the base of said collar and adapted to snugly receive said securing tip, the head of said grommet having an outer counterbore and an inner counterbore recessed below said outer counterbore, spaced from the outer end of said grommet, and extending between said outer counterbore and said inner bore, said securing tip having a length such that its outer end may project beyond the inner end of said inner counterbore and be swaged outwardly into an annular lip seated in said inner counterbore and flush with the inner surface of said outer counterbore.

2. A fastener for mounting in a through opening in a light-weight panel of honeycomb sandwich structure, comprising: a spacer and a grommet each including a stem section, a head at one end thereof and a coupling part at the other end thereof, the coupling part of said spacer comprising a relatively thick-walled neck having a cylindrical outer wall concentric with and reduced in diameter below the maximum outer diameter of the body of that stem section, and a relatively thin walled coaxial tubular securing tip projecting axially beyond the end of said neck, the coupling part of said grommet comprising a cylindrical coupling collar defining a counterbore snugly but freely receiving said neck and an inner bore extending outwardly from the base of said collar and snugly receiving said securing tip, the head of said grommet having an outer counterbore, an inner counterbore, spaced from the outer end of said grommet, recessed below said outer counterbore and extending between the same and said inner bore, and an offset cylindrical shoulder extending between said counterbores, said securing tip having at its outer end an annular lip flanged outwardly and seated in said inner counterbore with a frusto conical inner surface flush with the surface of said outer counterbore and its outer end abutting said offset shoulder, said stem parts cooperatively constituting a stem extending through said panel opening and said heads being clamped against the respective faces of said panel.

3. A spacer unit as defined in claim 2 wherein said inner and outer counterbores are in the form of frusto conical countersinks and wherein said lip has an internal frusto conical face constituting a continuation of the outer countersink and of the same taper so as to cooperate therewith in defining a frusto conical throat to receive a countersunk fastener head.

4. A spacer unit as defined in claim 3, wherein said collar has a thickness approximately one third the total wall thickness of the body of said spacer stem section, said securing tip has a wall thickness less than one third of said total wall thickness and said neck has a radial thickness more than half said total wall thickness.

5. A spacer unit as defined in claim 2, wherein said main body portion of the stem of said spacer has an end defining a radial shoulder at the base of said neck and wherein said neck has an end defining a radial shoulder at the base of said securing tip, wherein the end of said collar bears against said first mentioned radial shoulder and wherein the stem section of said grommet, at the base of said collar, defines a radial shoulder bearing against said second mentioned radial shoulder.

6. A spacer unit as defined in claim 2, wherein said stem section of the spacer is provided with a through bore to receive a through bolt.

7. A spacer unit as defined in claim 2, wherein said stem section of the spacer is provided with a through bore to receive a through bolt, said through bore having an intermediate internally threaded portion.

8. A spacer unit as defined in claim 2, wherein said stem section of the spacer is provided with a through bore to receive a through bolt, said through bore having a smooth cylindrical wall throughout the length of said spacer.

9. A spacer unit as defined in claim 2, wherein said stem section of the spacer is provided with a closed-bottom, internally threaded recess for receiving and securing a threaded fastener stud, said spacer having a closed head defining the closed bottom of said recess at the end of the spacer unit opposite said throat.

10. A spacer unit as defined in claim 2, including a thread locking plug secured by a press fit in a cylindrical radial bore in the main body portion of the stem section of said spacer.

References Cited in the file of this patent
UNITED STATES PATENTS

| | | |
|---|---|---|
| 642,375 | Simpson | Jan. 30, 1900 |
| 2,098,892 | Sinzt | Nov. 9, 1937 |
| 2,583,719 | White | Jan. 29, 1952 |
| 2,670,021 | Torresen et al. | Feb. 23, 1954 |
| 2,700,172 | Rohe | Jan. 25, 1955 |